United States Patent [19]

Rosen et al.

[11] Patent Number: 5,625,624
[45] Date of Patent: *Apr. 29, 1997

[54] HIGH DATA RATE SATELLITE COMMUNICATION SYSTEM

[75] Inventors: Harold A. Rosen, Washington, D.C.; Victor S. Reinhardt, Rancho Palos Verdes, Calif.; Parthasarathy Ramanujam, Redondo Beach, Calif.; Gregory C. Busche, Manhattan Beach, Calif.; Andrew L. Strodtbeck, El Segundo, Calif.; Jennifer L. Vollbrecht, Hermosa Beach, Calif.

[73] Assignee: Hughes Aircraft Company, Los Angeles, Calif.

[*] Notice: The term of this patent shall not extend beyond the expiration date of Pat. No. 5,473,601.

[21] Appl. No.: 142,524

[22] Filed: Oct. 21, 1993

[51] Int. Cl.$^6$ ............................................... H04Q 11/04
[52] U.S. Cl. ...................... 370/307; 455/12.1; 455/13.3; 370/316
[58] Field of Search ...................... 370/49.5, 50, 18, 370/75, 97, 95.3; 455/12.1, 13.1, 13.3, 3.2; 379/105

[56] References Cited

U.S. PATENT DOCUMENTS 4,199,660  4/1980  Dill et al. ................................. 370/50

(List continued on next page.)

FOREIGN PATENT DOCUMENTS 0180557  10/1985  European Pat. Off. ........ H04B 7/185

(List continued on next page.)

OTHER PUBLICATIONS

R. Andrewartha, et al; *On–Board Processing Techniques for Application in a Business Telecommunications Satellite Pay load*, J. of Inst. of Electronic & Radio Engineers, vol. 58, No. 3, May, 1988, pp. 99–108.

(List continued on next page.)

*Primary Examiner*—Douglas W. Olms
*Assistant Examiner*—Shick Hom
*Attorney, Agent, or Firm*—Phyllis Y. Price; W. K. Denson-Low

[57] ABSTRACT

A satellite-based communication system providing high rate transfer of data between linked terminals. The system comprises a plurality of user terminals (VSAT's) that are linked by and that communicate with each other by way of a satellite-based relay system. A network control center provides configuration signals that control the satellite relay system and coordinate linking of terminals to each other. Frequency division multiplexing uplinks are used from the terminals and the network control center to the satellite relay system. Time division multiplexing are used on downlinks from the satellite relay system to the terminals and the network control center. Each user terminal comprises a data compression and decompression circuit, a transceiver, and an antenna for transmitting and receiving data to and from the satellite relay system. The satellite relay system comprises a satellite, a wide area antenna, a plurality of receive antennas, a plurality of transmit antennas, and a signal processor. The wide area antenna is provided for communicating control signals between the user terminals and the network control center. The plurality of receive antennas operate in a first frequency band and produce a first plurality of beams that cover a service area. The plurality of receive antennas receive time domain modulated data from the user terminals. The plurality of transmit antennas operate in a second frequency band and produce a second plurality of beams that cover the service area. The plurality of transmit antennas transmit frequency domain modulated data to the user terminals. The signal processor demodulates the time domain modulated data received from a user terminal, routes the demodulated data so that it is transmitted to a second user terminal, remodulates the data to provide frequency domain modulated data, and transmits the frequency domain modulated data to the second user terminal. Video cameras and monitors are coupled to the user terminals to provide for video teleconferencing.

9 Claims, 4 Drawing Sheets

U.S. PATENT DOCUMENTS

| | | | |
|---|---|---|---|
| 4,425,639 | 1/1984 | Acampora et al. | 370/50 |
| 4,625,308 | 11/1986 | Kim et al. | 370/95.3 |
| 4,901,310 | 2/1990 | Ichiyoshi | 370/49.5 |
| 5,361,261 | 11/1994 | Edem et al. | 370/97 |
| 5,410,343 | 4/1995 | Coddington et al. | 379/105 |
| 5,463,656 | 10/1995 | Polivka et al. | 370/18 |
| 5,473,601 | 12/1995 | Rosen et al. | 370/50 |

FOREIGN PATENT DOCUMENTS

| | | | |
|---|---|---|---|
| 0393646 | 10/1990 | European Pat. Off. | H04B 7/185 |
| 0497449A3 | 8/1992 | European Pat. Off. | H04B 7/212 |
| 0549451A1 | 12/1992 | European Pat. Off. | H04J 4/00 |

OTHER PUBLICATIONS

F. Ananasso, et al, *A Multirate Digital Multicarrier Demodulator: Design, Implementation, and Performance Evaluation*, IEEE J. on Selected Areas in Communications, No. 8, Oct., 1992, pp. 1326–1341.

HIGH DATA RATE SATELLITE COMMUNICATION SYSTEM

BACKGROUND

The present invention relates generally to satellite communication systems, and more particularly, to a high data rate satellite communication system that provides for data, voice and video communication between individuals.

The past several decades has seen the development of communications systems that provide for the real-time distribution of information on a global scale. The development of such global communication systems has evolved along several paths that use either ground-based or satellite-based communication. Satellite-based systems have been employed for many years to distribute voice, data and video signals for global broadcasting of news and sporting events, for example. With the advent of newer high power satellite systems and technology, direct broadcast television systems are available that provide for broadcasting of television signals from up to 100 stations using a single satellite. Individuals install an antenna and a satellite receiver that receives the broadcasts directly by way of the satellite and display them on a television monitor.

In order to provide for more personal communication or teleconferencing between individuals, companies such as AT&T, for example, have developed a video telephone system that employs a small (3–4 inch) television monitor in combination with a conventional telephone. The video telephone system typically uses fiber optic links to provide a sufficient bandwidth to carry the video along with the voice signals. However, this type of system does not have enough bandwidth to provide for full motion video. Furthermore, this system is relatively expensive per installation.

No currently available system has provided for relatively affordable personal teleconferencing between individuals. Such affordability involves three aspects. The system should have a low utilization cost. Currently deployed satellites can only support about 100 VSAT links at 1.5 MBPS. It would be desirable to have a system that provides on the order of 100 times this capability in order to provide for more cost-effective delivery of service. Also, personal communication systems should have relatively low terminal costs. The currently available systems have not exploited available VCR cameras and low loss compression CODEC standards, which help provide for a low cost system. Finally, personal communication systems should have low installation costs.

Thus there is a need for a communication system that provides for the communication and distribution of full motion video, voice and data signals, to provide for affordable personal teleconferencing between individuals. There is also a need for a communication system that provides for cost-effective delivery of personal communication services that is affordable for users that are underserved by the conventional terrestrial communication infrastructure in terms of equipment, installation, and utilization costs. Accordingly, it is an objective of the present invention to provide for a high data rate satellite communication system that provides for the communication of data, voice and video between individuals in a cost-effective manner.

SUMMARY OF THE INVENTION

In order to meet the above and other objectives, the present invention is a high data rate satellite communication system that comprises a plurality of user terminals (VSAT's) that are linked by and that communicate with each other by way of a satellite relay system. Communication is achieved from terminal to terminal in a single hop. Current VSAT systems use a hub station and thus incur two round-trip satellite delays that make video teleconferencing unpleasant for users. The hub function is performed in the satellite relay system and thus eliminates the delays.

The present system provides for communication of data at high data rates, that permits video teleconferencing and high speed file transfers between linked terminals. A network control center provides control signals that control the satellite relay system and coordinate linking of terminals to each other. The system employs frequency division multiplexing on uplinks from the terminals and the network control center to the satellite relay system. The system employs time division multiplexing on downlinks from the satellite relay system to the terminals and the network control center.

Each user terminal comprises a transceiver for modulating and demodulating input and output data, and an antenna for transmitting and receiving encoded data to and from the satellite relay system. Additionally, a user terminal that is configured for receiving/transmitting video contains a data compression circuit for compressing input data and decompressing output data.

The satellite relay system is comprised of a satellite, a wide area antenna, a plurality of satellite receive antennas, a plurality of satellite transmit antennas, and a signal processor. The wide area antenna is provided for communicating control signals between the user terminals and the network control center. The plurality of satellite receive antennas operate in a first frequency band and produce a first plurality of beams that cover a predefined service area. The plurality of satellite receive antennas receive time domain multiplexed data from a source user terminal on a first beam. The plurality of satellite transmit antennas operate in a second frequency band and produce a second plurality of beams that cover the service area. The plurality of satellite transmit antennas transmit the time division multiplexed data to a destination user terminal on a second beam. The second beam may be geographically colocated with the first beam, depending upon the respective locations of the source and destination user terminals.

The signal processor demodulates frequency division multiplexed data received on the first beam from the source user terminal. It then routes the demodulated data so that it can be transmitted on the second beam to the destination user terminal. The signal processor then remodulates the demodulated data to provide encoded data comprising time division multiplexed data. Finally the signal processor transmits the time division multiplexed data on the second beam to the destination user terminal.

The present system may be used to provide video teleconferencing between the two user terminal, for example. In this case, a video camera and a television monitor are employed to generate the input data and display the output data at the user sites. The video data is processed to provide a 384 Kbps, a 768 Kbps, or a 1,544 Kbps data rate that is transmitted over the link established between the two user terminals, and the available data rates support full motion video and high speed data transfers.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
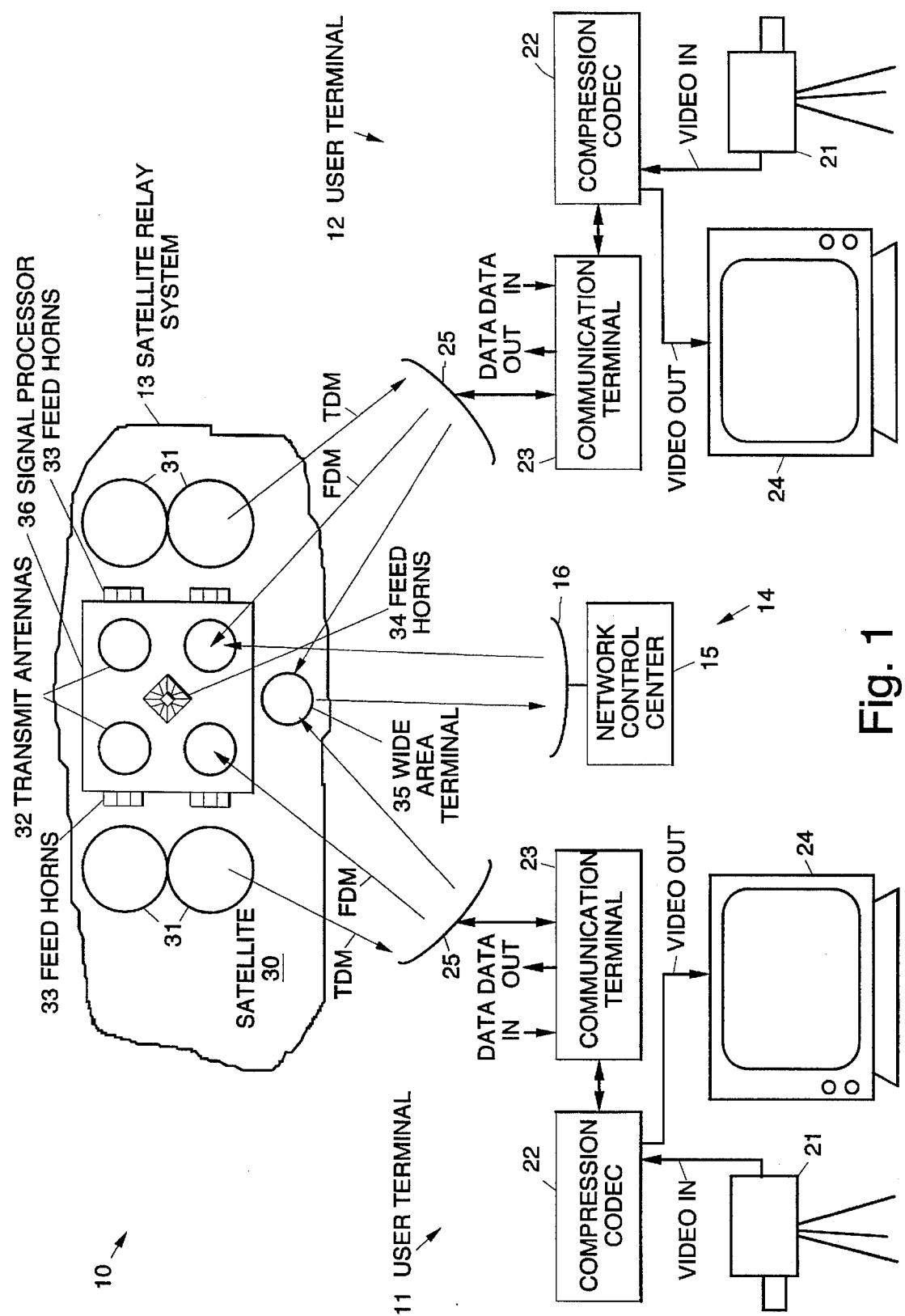
FIG. 1 illustrates a high data rate satellite communication system in accordance with the principles of the present invention.

Referring to the drawing figures, FIG. 1 illustrates a high data rate satellite communication system 10 in accordance with the principles of the present invention. The system 10 comprises a plurality of user terminals (VSAT's) 11, 12 (corresponding to first and second user terminals 11, 12) that are linked by and that communicate with each other by way of a satellite relay system 13. A network control center 14 provides control signals that control the satellite relay system 13 and coordinate linking of terminals 11, 12 to each other. The system 10 employs frequency division multiplexing on uplinks from the terminals 11, 12 and the network control center 14 to the satellite relay system 13. The system 10 employs time division multiplexing on downlinks from the satellite relay system 10 to the terminals 11, 12 and the network control center 14.

Each user terminal 11, 12 comprises a data compression coder/decoder (CODEC) circuit 22 for compressing input data and decompressing output data, a transceiver 23 for modulating and demodulating input and output data, and an antenna 25 for transmitting and receiving encoded data to and from the satellite relay system 13. In the alternative, and in the case of data communication (opposed to video), the compression circuit 22 is replaced by interface circuitry that interfaces to a data source, such as a local area network, a terminal or computer, or a data communication line, or the like. The satellite relay system 13 is comprised of a satellite 30, a plurality of receive antennas 32, a plurality of transmit antennas 31, a wide area antenna 35, and a signal processor 36. Respective pluralities of feed horns 33, 34 are provided to feed data to and from the respective transmit and receive antennas 31, 32. The wide area antenna 35 is provided for communicating control signals between the user terminals 11, 12 and the network control center 14. The network control center 14 comprises a control processor 15 for generating configuration and control signals that link the user terminals 11, 12 by way of the satellite relay system 13, and an antenna 16 coupled to the control processor 15 for transmitting and receiving the control signals.

The plurality of receive antennas 32 operate in a first frequency band and produce a first plurality of beams (shown in FIG. 4) that cover a predefined area. The plurality of receive antennas 32 receive frequency division multiplexed data from the first user terminal 11 on a first beam. The plurality of transmit antennas 31 operate in a second frequency band and produce a second plurality of beams that cover the predefined area. The plurality of transmit antennas 31 transmit the time division multiplexed data to the second user terminal 12 on a second beam. It is to be understood that the second beam may be geographically colocated with the first beam, depending upon the respective locations of the source and destination user terminals 11, 12.

The signal processor 36 demodulates frequency division multiplexed data received on the first beam from the first user terminal 11, route the demodulated data so that it is transmitted on the second beam to the second user terminal 12, remodulate the demodulated data to provide encoded data comprising time division multiplexed data, and transmit the frequency division multiplexed data on the second beam to the second user terminal 12.

The present system 10 may be employed to provide video teleconferencing between the two user terminal 11, 12, for example. In this case, a video camera 21 and a television monitor 24 are employed to generate the input data and display the output data at the user locations. The video data is converted to a digital format and compressed using an internationally standardized compression technique to provide a 384 KHz data rate the is transmitted over the link established between the two user terminals 11, 12. This data rate supports full motion video. Higher data rates, up to 1.5 MHz, may also be transmitted between the user terminals 11, 12 using the present system 10. Thus, the system 10 provides for communication of data at high data rates, to permit video teleconferencing and high speed file transfers between linked terminals. The present system 10 is not limited to the distribution of video signals, but may also be employed to distribute data between the terminals as well.

When the system 10 is used for data communication, the compression circuit 22 is replaced by interface circuitry that interfaces to the data source, such as a local area network, a terminal or computer, or a data communication line, or the like. The camera 21 and television monitor 22 are generally not used, and are replaced by a computer terminal, for example, which is used to process transmitted or received data in a conventional manner.

Figure 2:
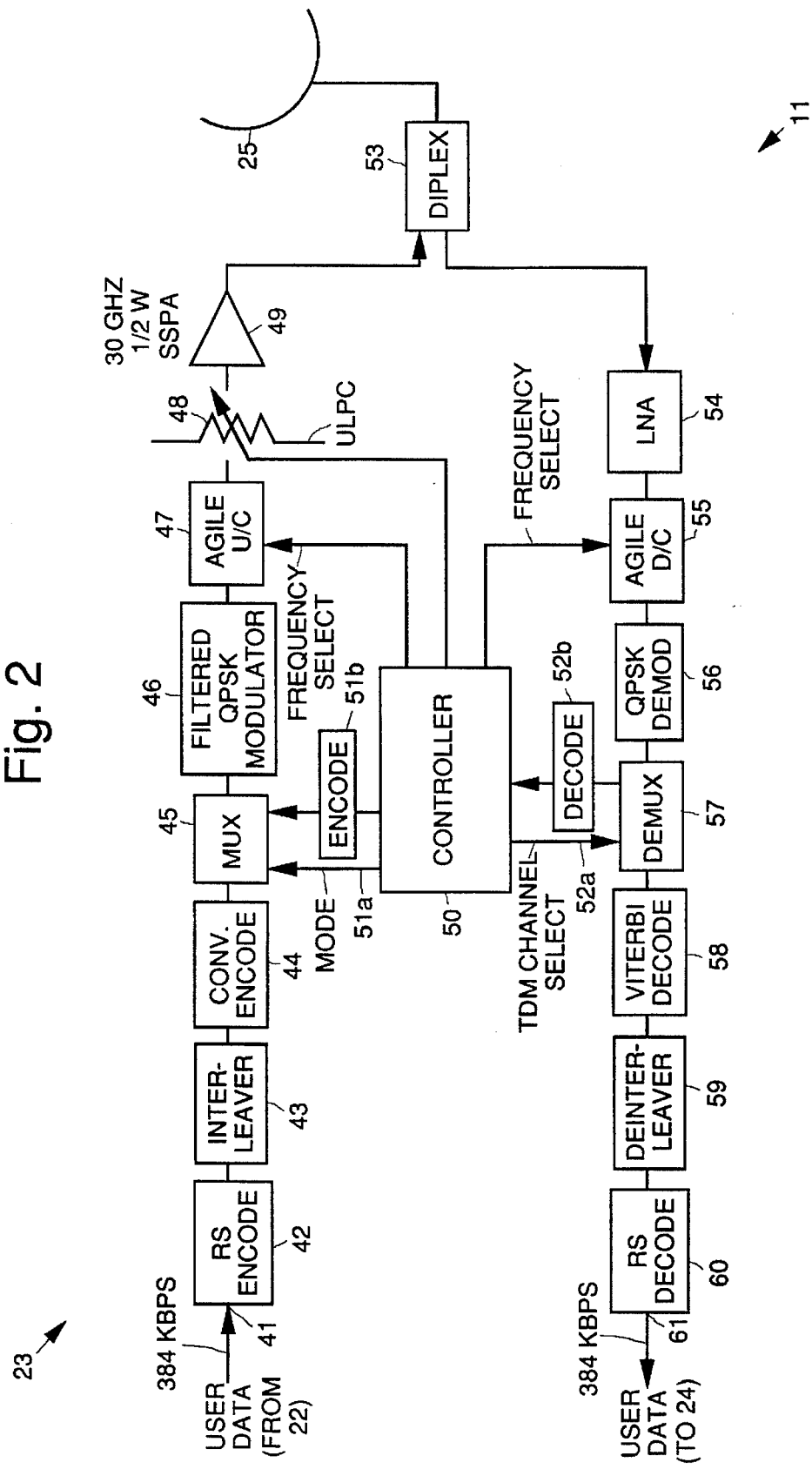
FIG. 2 is a block diagram showing a user terminal employed in the system of FIG. 1.

A more detailed description of certain components of the system 10 is provided below. FIG. 2 is a block diagram showing a user terminal 11, for example, employed in the system of FIG. 1, and in particular the details of the transceiver 23 thereof. With regard to the transmitter portion of the transceiver 23, it is comprised of a data input port 41 that receives input data, such as video and analog voice signals that have been compressed by the compression circuit 22. The components of the transceiver 23 are generally well-known to those skilled in the art, and the functional blocks forming the transceiver 23 may be readily combined to implement the transceiver 23. The compressed data is input to a Reed-Solomon (RS) encoder 42 and the data is interleaved by means of an interleaver 43. The interleaved data is then convolutionally encoded in a convolutional encoder 44 whereafter it is multiplexed in a multiplexer 45 with control signals 51a and encoding signals 51b generated by a controller 50. The multiplexed data is processed by a filtered quantenary phase shift keyed (QPSK) modulator 46 and upconverted by an agile upconverter (U/C) 47. The upconverted data is then variably attenuated in an uplink power control circuit (ULPC) 48 and amplified by a solid state power amplifier 49. The uplink power control circuit (ULPC) 48 mitigates the effect of uplink interference, rain fade, and beam roll-off, and the like. The amplified data signals are then coupled by way of a diplexer 53 to the antenna 25.

With regard to the receiver portion of the transceiver 23, it is comprised of a low noise amplifier (LNA) 54 that is coupled to an output port of the diplexer 53. An agile upconverter (U/C) 55 is coupled to the low noise amplifier 54 that downconverts received time domain modulated data and applies it to a QPSK demodulator 56. A demultiplexer 57 demultiplexes the received data and strips off time division multiplexed (TDM) channel information 52a and decoding signals 52b that are applied to the controller 50 to control the terminal operation including data rate, uplink frequency and downlink TDM slot selections. The demultiplexed data is then decoded in a Viterbi decoder 58 and deinterleaved in a deinterleaver 59. The deinterleaved data is then decoded in a Reed-Solomon (RS) decoder 60 and output from an output port 61 of the transceiver 23.

It is to be understood that the present invention is not limited to the above-described error correction coding circuits and modulation scheme. Clearly, other modulation and/or error correction schemes, such as Reed Solomon codes combined with SQPSK or BPSK modulation, for example, may be readily employed in the present invention.

Figure 3:
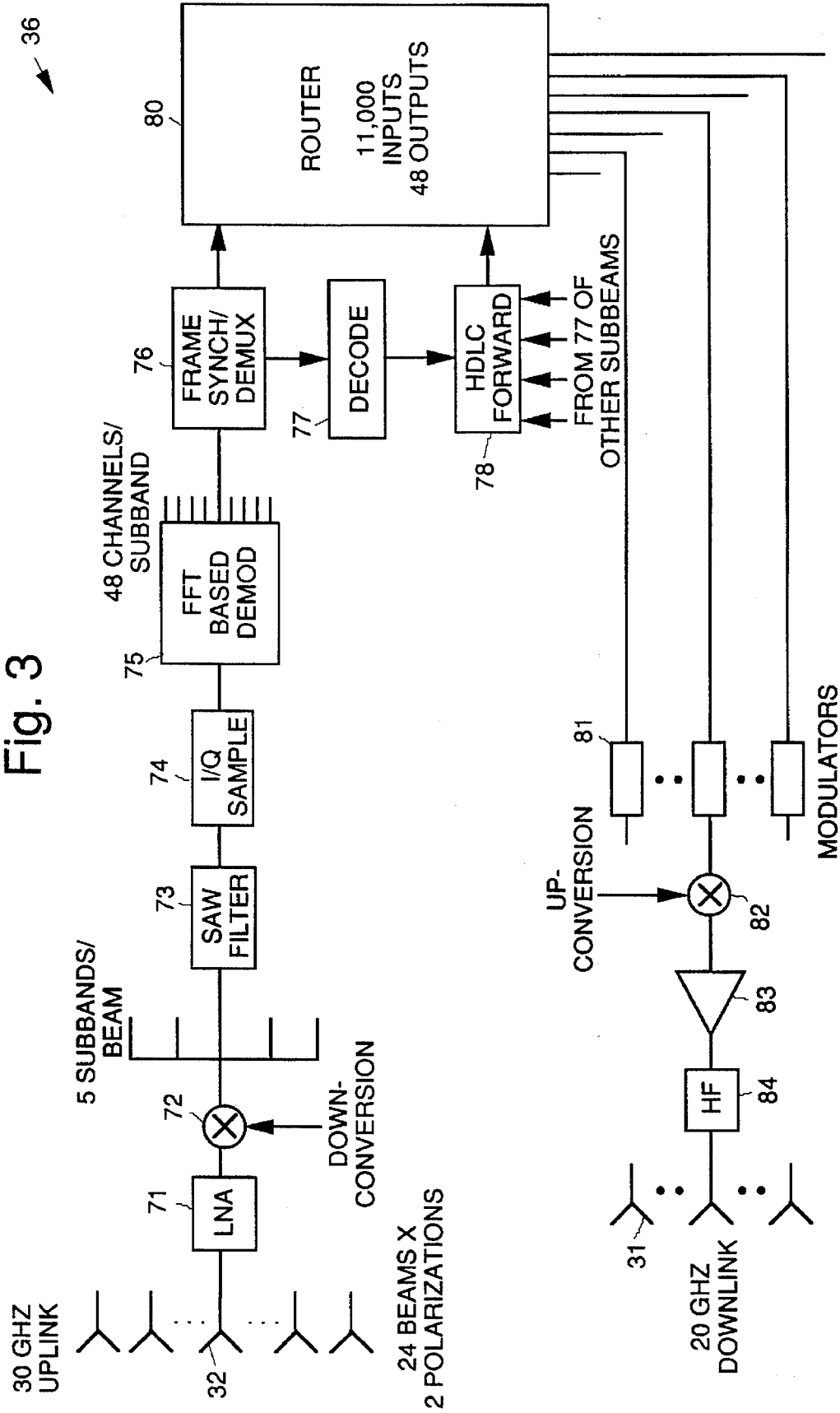
FIG. 3 shows a block diagram of a satellite processor used in the system of FIG. 1.
Figure 5A:
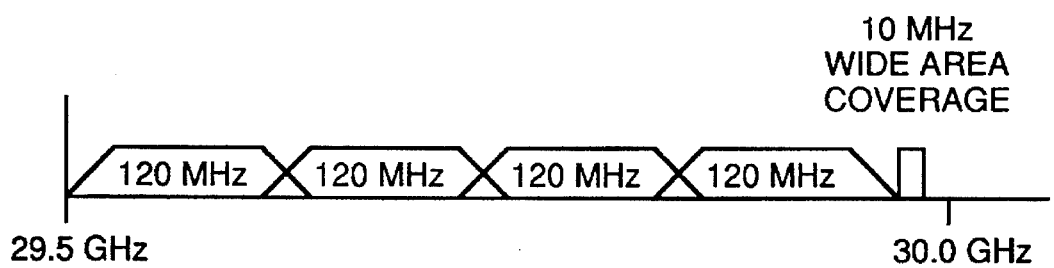
FIGS. 5a and 5b show the characteristics of uplink and downlink beams of the beam pattern shown in FIG. 4.

FIG. 3 shows a block diagram of the satellite signal processor 36 used in the system 10 of FIG. 1. The signal processor 36 is comprised of a plurality of low noise amplifiers 71 that are individually connected to each of the plurality of receive antennas 32. A downconverter 72 is used to downconvert the received data into a signal comprising five subbands per beam. The five subbands comprising the received data are shown in FIG. 5a. A surface acoustic wave (SAW) filter 73 is used to filter the data and a I and Q samples 74 are generated. A fast Fourier transform (FFT) based demodulator 75 is employed to demodulate the fourty-eight channels in each subband. Frame synchronization and demultplexing is then performed in a demultiplexer 76.

High-level dat link control packets used to transmit data between the network control center 13 and an end user terminal 11, 12, are decoded by a decoder 77 and applied to to a HDLC Forwarding circuitry (HDLC Forward) 78. The demultiplexed data is then routed in a programmable router 80 which is configured to route the data to the second user terminal 12 and applies the demodulated data to a signal path associated with the beam that communicates with the second terminal 12. The routed data is then remodulated in a selected one of a plurality of modulators 81, and upconverted using a mixer 82 to the appropriate transmit frequency, amplified in an amplifier 83 and is filtered in a high-frequency (HF) output filter 84. The multiplexed data is then transmitted to the second user terminal 12 by way of the appropriate one of the plurality of transmit antennas 31.

The fast Fourier transform (FFT) based approach to the design of the satellite signal processor 36 provides for flexibility to support multiple data rates and achieves a desired power efficiency to provide for a cost-effective satellite 13. It is to be understood that the present invention is not limited to this specific signal processor design. Other signal processor designs may be implemented by those skilled in the art that support multiple data rates and desired power efficiency levels.

Figure 4:
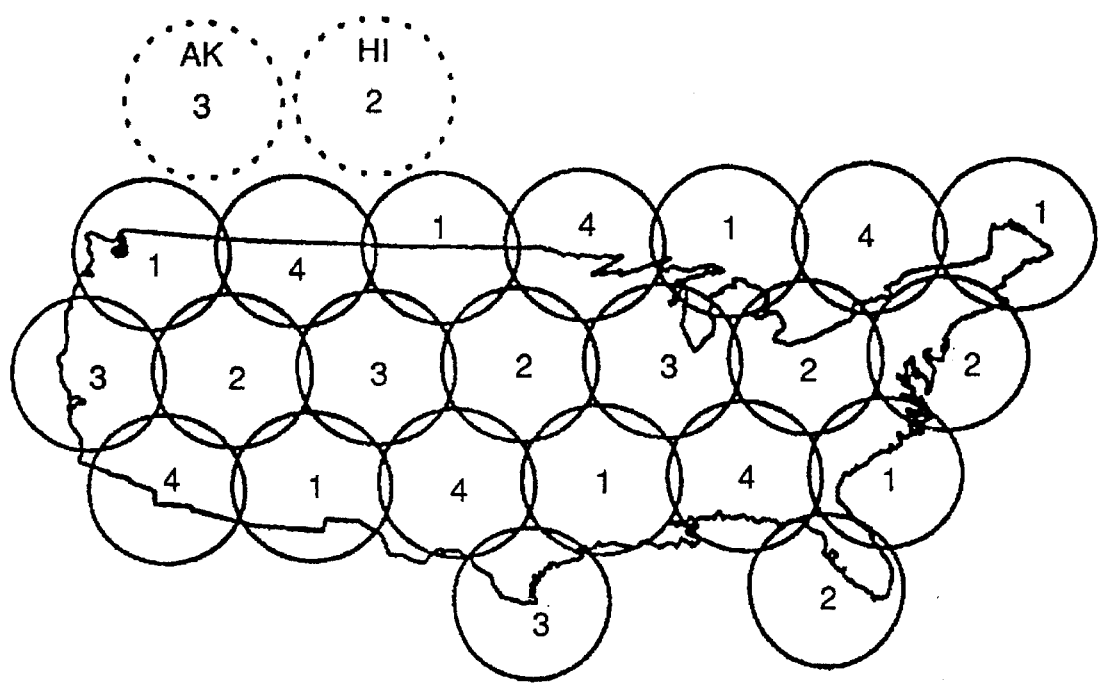
FIG. 4 illustrates a typical beam pattern employed by the system of FIG. 1.
Figure 5B:
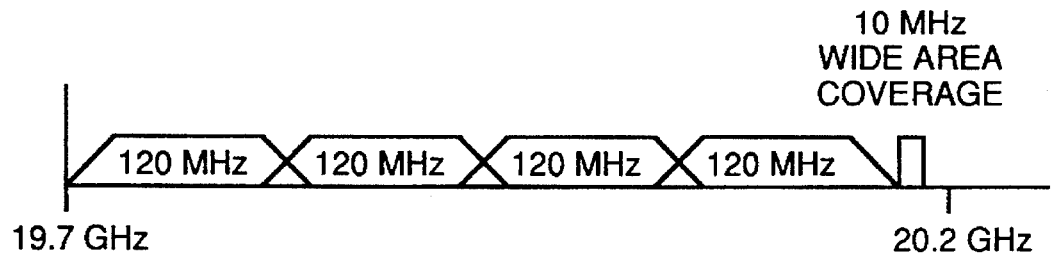

FIG. 4 illustrates a typical beam pattern employed by the system 10 of FIG. 1. FIG. 4 shows the use of 24 beams that completely cover a desired operating area; in this case the continental United States, Alaska (AK) and Hawaii (HI). The respective beams are number with an identifying number (1, 2, 3, 4) that indicates which respective subband is assigned to each beam. The subbands are illustrated in FIGS. 5a and 5b. More particularly, FIGS. 5a and 5b show the characteristics of uplink and downlink beams of the beam pattern shown in FIG. 4. As can be seen from FIG. 4, twenty-four beams each having two polarization states (right hand circularly polarized, RHCP, left hand circularly polarized, LHCP), are employed to obtain full coverage of the United States. However, it is to be understood that different linear polarization states may be readily employed in the present system 10. The four subbands shown in FIG. 5 are thus reused six times to achieve full coverage. FIG. 5a shows the transmit bands that comprise four 120 MHz subbands and a 10 MHz wide area coverage (CONUS) subband that extends from 29.5 GHz to 30.0 GHz. FIG. 5b shows the receive bands that comprise four 120 MHz subbands and a 10 MHz wide area coverage (CONUS) subband that extends from 19.7 GHz to 20.2 GHz. These frequencies are in the Ka band.

More particularly, multi-fold frequency reuse is a key to achieving low utilization costs for the present system 10. In the baseline design of the system 10, the polarization and spatial reuse of available frequencies therein achieves a twelve-fold increase in the effective bandwidth and number of users that may be supported. A simple antenna design achieves multiple, highly overlapped antenna beams by using four separate antennas 31, 32 for both receive and transmit beams. This antenna design provides for eight total apertures. This allows generation of overlapping beams without use of complex beamforming networks that add cost and complexity to the system 10, and incur circuit loss that degrades the sensitivity of the satellite relay system 13 and effective radiated power from the antennas 31, 32. This implementation provides for six-fold reuse of each frequency polarization pair (12-fold total) and guarantees a spatial separation of at least one full beam radius between reused beams.

Providing this high level of reuse requires a system design that is tolerant of the interference that is inevitable when several beams operate on the frequency and polarization. In the present system, this tolerance is achieved by three things. First, all communication signals are generated in the digital domain. This eliminates onerous SNR requirements that are typical of analog modulations such as FM-TV, FDM-FM telephony and other services. Second, use of concatenated coding forward error correction techniques further reduces the signals sensitivity to interference. Finally, satellite-based demodulation effectively regenerates a high quality digital data stream on the satellite 30. This regeneration greatly reduces the impact of uplink interference.

In operation, and in order to gain access to the system 10, a call setup sequence is implemented between a source user terminal 11, the network control center 14, and a destination user terminal 12. This involves generating a number of terminal control signals at the source and destination user terminals 11, 12, and generating satellite configuration and control signals that configure and control the satellite relay system to route video and audio data between source and destination user terminals 11, 12. First, the source user terminal 11 requests a physical channel to transmit on. This is accomplished by generating source and destination IDs, determining which spot beam the source user terminal 11 is located in by monitoring each of the four frequency downlinks to see which one is strongest, and determining which uplink frequency has the most performance, based on a database of interferers, and some trial and error.

The source user terminal 11 then sends the above information to the network control center 13 by randomly choosing among allowable frequencies within the wide area coverage beam, and organizing the data into a data packet. This data packet has a standardized format, known as a high-level data link control (HDLC) packet. The source user terminal 11 then bursts the data packet to the satellite relay system 13 where it is translated in frequency, amplified, and retransmitted to the network control center 14, without using the demodulation and remodulation processes. This is known as a bent-pipe architecture. The network control center 14 employs demodulators that access the data packets as they are burst to it.

If there is no contention between the source and destination user terminals 11, 12, in that two terminals 11, 12 are not trying to burst on the same channel at the same time, then an acknowledgement signal is sent to the source user terminal 11 by the network control center 13 by way of the "orderwire" channel. However, if the source user terminal does not receive an acknowledgement signal after a sufficient time delay (for example, twice the geosynchronous altitude delay) then it waits another period of time, the length of which is chosen randomly to avoid contention occurring again and again, and retransmits the data packet. This is referred to herein as an "Aloha" random access technique.

Along with the acknowledgement signal, the network control center 14 assigns the source user terminal 11 to a particular FDM uplink channel and a TDM downlink channel. This request cycle using the Aloha channel and channel assignment using the orderwire channel may take several iterations if uplink interference is a problem. The orderwire uplink channel is the FDM channel of the network control center 14. A second uplink frequency may be used to communicate with or to configure the router 80 in the satellite relay system 13. The orderwire FDM uplink processes information that is transmitted to the source and destination user terminals 11, 12. This information is broadcast, or more precisely multicast on, say, every channel 1 of every TDM downlink beam. Thereafter, the FDM uplinked data is demodulated, routed to every downlink beam where it is time division multiplexed with other data channels, then remodulated and downlinked to every user terminal. Each user terminal continually monitors this downlink TDM channel and can recognize and extract messages addressed to it.

Next, the network control center 14 calls the destination user terminal 12. Again, this takes place by way of the orderwire TDM channel. The destination user terminal 12 accesses data addressed to it off the orderwire TDM channel, and if it is not busy, it sends an OFFHOOK message to the network control center 14 using the Aloha channel along with data indicative of which beam it is in and best uplink frequency. Acknowledgement from the network control center 14 is performed by way of the orderwire TDM channel, and the destination user terminal 12 is assigned its uplink frequency and downlink time slot.

Data flow, call monitoring and terminal polling will now be described. Once the source and destination user terminals 11, 12 have been assigned their beams and frequency and time slots, the network control center 14 reconfigures the routes to setup the end-to-end data link. Thereafter, data transfer between terminals 11, 12 is generally independent of the network control center 14. Once the communication link between the user terminals 11, 12 is established, input data generated at a source user terminal 11 is frequency division multiplexed and transmitted to the satellite relay system 13. The satellite relay system 13 demodulates the data, routes it so that it is retransmitted on a beam that communicates with the destination user terminal 12, remodulates the data, and then transmits the time division multiplexed data to the destination user terminal 12. However, it is necessary for the network control center 14 to monitor the calls so that system resources are not unnecessarily tied up if a connection is lost. This is achieved by causing both terminals 11, 12 to send periodic messages to the network control center 14 indicating that they are active on the network, or the network control center 14 may periodically poll each terminal 11, 12 and terminate a call if either terminal 11, 12 is unresponsive or provides a signal indicating that it is ONHOOK (has hung up).

Call termination will now be described. If a call is terminated, in that the network control center 14 received a HANGUP signal from one terminal 11, 12 or either terminal 11, 12 might be unresponsive to polling, or either terminal 11, 12 might fail to send a monitoring message to the network control center 14 within the required time period, a number of system resources are released. These resources include the uplink FDM channels for both terminals 11, 12, including the satellite demodulators, the downlink TDM channels for both terminals 11, 12, and the path through the router 80 that was reserved for the terminals 11, 12. Signals are sent to both terminals 11, 12 by way of the orderwire TDM channel to cease transmitting. Each terminal 11, 12 may then send an acknowledgement signal by way of the Aloha channel (wide area coverage beam) to the network control center 14 to reduce interference with other terminals.

The above-described call setup, data flow, call monitoring and terminal polling, and call termination protocols are described in U.S. Pat. No. 5,485,464, issued Jan. 16, 1996, entitled "Communication Protocol for a High Data Rate Satellite Communication System", assigned to the assignee of the present invention, the contents of which are incorporated herein by reference. The above-described frequency reuse scheme is described in U.S. Pat. No. 5,473,601, issued Dec. 5, 1995, entitled "Frequency Reuse Technique for a High Data Rate Satellite Communication System", assigned to the assignee of the present invention, the contents of which are incorporated herein by reference.

Thus there has been described a new and improved high data rate satellite communication system that provides for data, voice and video communication between individuals. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A high data rate satellite communication system comprising:
    a plurality of user terminals that each comprises:
        a transceiver for receiving input data and outputting output data, for encoding the input data to provide frequency division multiplexed data, for decoding received encoded data comprising time division multiplexed data to produce the output data, and for generating terminal control signals that identify source and destination user terminals that are to communicate with each other; and
        an antenna coupled to the transceiver for transmitting and receiving the multiplexed data and the terminal control signals;
    a satellite relay system comprising:
        a satellite;
        a wide area antenna disposed on the satellite for communicating satellite configuration and control signals between a network control center and the satellite relay system, and for communicating the terminal control signals between the user terminals and the satellite relay system;
        a plurality of receive antennas disposed on the satellite that operate in a first frequency band that comprises a first plurality of subbands, the receive antennas operating on different subbands and producing a first plurality of beams that cover a predefined area for receiving the frequency division multiplexed data from the user terminals;

a signal processor coupled to the plurality of receive antennas for demodulating the frequency division mulitiplexd data received from a source user terminal, for routing the demodulated data so that it is transmitted to a desired destination user terminal, for remodulating the demodulated data to provide remodulated time division multiplexed data, and for transmitting the remodulated time division multiplexed data to the desired destination user terminal;

a plurality of feed horns that couple the signal processor to the receive antennas, each receive antenna producing a seperate beam from each feed horn to which it is coupled, the feed horns being oriented towards their respective receive antennas such that each receive antenna produces beams that do not overlap with each other within the predefined area, the beams from the receive antennas facilitating geographic frequency reuse by creating an interlaced pattern of beams that covers the predefined area;

a plurality of transmit antennas disposed on the satellite and coupled to the signal processor that operate in a second frequency band that comprises a second plurality of subbands, the transmit antennas operating on different subbands and producing a second plurality of beams that cover the predefined area for transmitting the remodulated time division mulitiplexed data to the desired destination user terminal; and a plurality of feed horns that couple the signal processor to the transmit antennas, each transmit antenna producing a seperate beam for each feed horn to which it is coupled, the feed horns being oriented towards their respective transmit antennas such that each transmit antenna produces beams that do not overlap with each other within the predefined area, the beams from the transmit antennas facilitating geographic frequency reuse by creating an interlaced pattern of beams that cover the predefined area;

and wherein the network control center comprises:

a control processor for processing the terminal control signals that link the source and destination user terminals by way of the satellite relay system, and for generating the satellite configuration and control signals that configure and control the satellite relay system and route encoded video and audio data between source and destination user terminals; and an antenna coupled to the control processor for transmitting and receiving the satellite configuration and control signals and the terminal control signals.

2. The system of claim 1 wherein the plurality of user terminals each further comprise:

a data compression and decompression circuit for receiving video and audio input data and outputting video and audio output data;

a video camera coupled to the data compression and decompression circuit for providing the video and audio input data; and a video monitor coupled to data compression and decompression circuit for displaying received video output data and outputting received audio data.

3. A high data rate satellite communication system comprising:

a plurality of user terminals that each comprises:

a data compression and decompression circuit for receiving video and audio input data and outputting video and audio input data;

a video camera coupled to the data compression and decompression circuit for providing the video and audio input data;

a video monitor coupled to the data compression and decompression circuit for displaying received video output data and outputting received audio data;

a transceiver coupled to the data compression and decompression circuit for encoding the video and audio input data to provide frequency division multiplexed data, and for decoding received encoded video and audio data comprising time division multiplexed data; and a satellite relay system comprising:

a satellite;

a wide area antenna disposed on the satellite for communicating satellite configuration and control signals between a network control center and the satellite relay system, and for communicating the terminal control signals between the user terminals and the satellite relay system;

a plurality of receive antennas disposed on the satellite that operate in a first frequency band that comprises a first plurality of subbands, the receive antennas operating on different subbands and producing a first plurality of beams that cover a predefined area for receiving the frequency division multiplexed data from the user terminals;

a signal processor coupled to the plurality of receive antennas for demodulating the frequency division multiplexed data received from a source user terminal, for routing the demodulated data so that it is transmitted to a desired destination user terminal, for remodulating the demodulated data to provide remodulated time division multiplexed data, and for transmitting the remodulated time division multiplexed data to the desired destination user terminal;

a plurality of feed horns that couple the signal processor to the receive antennas, each receive antenna producing a seperate beam for each feed horn to which it is coupled, the feed horns being oriented towards their respective receive antennas such that each receive antenna produces beams that do not overlap with each other within the predefined area, the beams from the receive antennas facilitating geographic frequency reuse by creating an interlaced pattern of beams that cover the predefined area;

a plurality of transmit antennas disposed on the satellite and coupled to the signal processor that operate in a second frequency band that comprises a second plurality of subbands, the transmit antennas operating on different subbands and producing a second plurality of beams that cover the predefined area for transmitting the remodulated time division multiplexed data to the desired destination user terminal; and a plurality of feed horns that couple the signal processor to the transmit antennas, each transmit antenna producing a separate beam for each feed horn to which it is coupled, the feed horns being oriented towards their respective transmit antennas such that each transmit antenna produces beams that do not overlap with each other within the predefined area, the beams from the transit antennas facilitating geographic frequency reuse by creating an interlaced pattern of beams that cover the predefined area;

and wherein the network control center comprises:

a control processor for processing the terminal control signals that link the source and destination user terminals by way of the satellite relay system, and for generating the satellite configuration and control signals that configure and control the satellite relay system and route encoded video and audio data between source and destination user terminals; and an antenna coupled to the control processor for transmitting and receiving the satellite configuration and control signals and the terminal control signals.

4. The satellite communication system of claim 1, comprising at least four transmit and four receive antennas.

5. The satellite communication system of claim 1, in which multiplexed data are generated in the digital domain with concatenated forward error control coding to mitigate system self interference.

6. The satellite communication system of claim 1, in which the first and second pluralities of beams each comprise polarized beams.

7. The satellite communication system of claim 3, comprising at least four transmit and four receive antennas.

8. The satellite communication system of claim 3, in which multiplexed data are generated in the digital domain with concatenated forward error control coding to mitigate system self interference.

9. The satellite communication system of claim 3, in which the first and second pluralities of beams each comprise polarized beams.

* * * * *